(12) United States Patent
Merkel

(10) Patent No.: US 8,484,918 B2
(45) Date of Patent: Jul. 16, 2013

(54) COMPOSITE STRUCTURAL ELEMENTS AND METHOD OF MAKING SAME

(75) Inventor: Michael J. Merkel, Florence, AZ (US)

(73) Assignee: Merkel Composite Technologies, Inc., Tempe, AZ (US)

( * ) Notice: Subject to any disclaimer, the term of this patent is extended or adjusted under 35 U.S.C. 154(b) by 647 days.

(21) Appl. No.: 12/251,539

(22) Filed: Oct. 15, 2008

(65) Prior Publication Data

US 2010/0089002 A1  Apr. 15, 2010

(51) Int. Cl.
*E04C 1/00* (2006.01)

(52) U.S. Cl.
USPC .......... 52/309.8; 52/309.3; 52/309.14; 52/514

(58) Field of Classification Search
USPC ............ 52/309.4, 309.1, 309.5, 309.6, 309.8, 52/309.9, 309.13–309.15
See application file for complete search history.

(56) References Cited

U.S. PATENT DOCUMENTS

| | | | |
|---|---|---|---|
| 6,117,376 A | | 9/2000 | Merkel |
| 2007/0224401 A1* | | 9/2007 | Telander ............... 428/212 |
| 2009/0047453 A1* | | 2/2009 | Folaron et al. ......... 428/34.1 |
| 2010/0050549 A1* | | 3/2010 | Schwartau ............. 52/284 |

FOREIGN PATENT DOCUMENTS

| | | |
|---|---|---|
| JP | 5-318642 | 12/1993 |
| JP | 2001-246686 | 9/2001 |
| JP | 2008-31193 | 2/2008 |
| WO | 02-09934 | 2/2002 |

OTHER PUBLICATIONS

International Search Report and Written Opinion for PCT/US2009/060878, dated May 3, 2010.

* cited by examiner

*Primary Examiner* — William Gilbert
(74) *Attorney, Agent, or Firm* — Andrew S. Langsam; Pryor Cashman LLP

(57) ABSTRACT

A composite structural element and a method for making same are provided. The element includes a polymer foam core and at least one fibrous layer adhered to the polymer foam core by epoxy. Nano-particles are suspended in the epoxy prior to curing; preferably they are mixed with the hardener before it is mixed with the resin. The polymer foam core is preferably an exothermic foam such as polyurethane, and heat generated by the exothermic foam cures the epoxy, thereby causing the fibrous layer to adhere to the foam core. The nano-particles may be made from at least one of carbon, a ceramic, tungsten, a carbide, titanium, zircon, aluminum, silver, or boron. When carbon nano-particles are used, the strength of the composite is greatly increased, and the curing time of the heat-curable epoxy is significantly reduced. Ceramic nano-particles can be used to increase penetration resistance and provide increased ballistic protection.

22 Claims, 4 Drawing Sheets

COMPOSITE STRUCTURAL ELEMENTS AND METHOD OF MAKING SAME

BACKGROUND OF THE INVENTION

1. Field of the Invention

The invention relates to structural elements used in construction and infrastructure, and more specifically to composite structural elements having a fibrous layer impregnated with epoxy, preferably adhered to a foam core.

2. Description of Related Art

Traditional composites gain much of their strength by the type of fibers (carbon fiber, Kevlar, fiberglass, etc.) that are included in the composite structure. For many composite applications, such as building materials, these fibers prove to be too costly and limit their use.

Due to cost constraints, there are no composite-based structural insulated panels on the market. Traditional structural insulated panels are made from either wood or steel structures that are insulated by either polyurethane or polystyrene. The insulating material is "sandwiched" between two layers of the wood or steel outer skin. Bonding between layers is done with various glues.

These traditional composites use expensive fiber materials such as those mentioned above to achieve high strength. This limits their use in cost-sensitive industries such as building and infrastructure. Other panel systems used for walls, roofs and floors are comparable in cost but have inherent material issues such as rotting, corrosion, and delamination between the insulating core and the exterior skins. In addition, other panel systems require additional layers to be added to their exterior before finishing the wall with stucco or mud.

One excellent composite-making method is described in U.S. Pat. No. 6,117,376 to Merkel, the instant inventor, and which is assigned to the instant assignee; the teachings of U.S. Pat. No. 6,117,376 are incorporated by reference herein. In this method, a mold is created and carbon fiber layers or skins line the inside surfaces of the mold halves. The carbon fiber layers are wetted with heat-curable epoxy, and the mold halves are closed together to form an interior cavity having an opening. Exothermic foam is introduced into the mold cavity in an amount so as to overfill the mold. The foaming material expands and heats up, causing the heat-curable epoxy to cure. Since an abundance of foam is provided, excess foam spills out of the opening in the cavity, but because the foam expands so rapidly, the pressure inside the mold causes the carbon fiber layers to be pressed flat against the inner surfaces of the mold. In addition, the epoxy cures (from the heat generated by the exothermic reaction of the foam) and causes the carbon fiber layers to stick securely to the internal foam. The resulting composite is exceptionally strong and can be created in substantially any shape. However, while the method of manufacture is easy and inexpensive and can even be performed on the construction site, as mentioned above, the carbon fiber layers are too expensive to make the resulting product a practical building material.

In addition to new construction, traditional infrastructure repair is lacking for similar reasons. For example, in repairing a columnar support of a bridge substructure, the conventional approach is to weld pre-rolled steel panels to the exterior of the column, and then backfill the structure with concrete. The problems with this approach are manifold. For one, the steel and concrete are extremely heavy and thus have high shipping costs. In addition, in performing this retrofit, the footing of the column must be replaced, and the roadway above must be closed. Finally, the process takes an unacceptably long time to complete.

Accordingly, there is a long-felt need for a building structure and material that is light weight, easy to manufacture, and cost-efficient as well, that can be used for both new construction as well as for repair purposes.

SUMMARY OF THE INVENTION

The invention is a composite structural element and method of making same. In one embodiment, the invention is a composite structural element having a polymer foam core and at least one fibrous layer adhered to the polymer foam core by epoxy, preferably heat-curable epoxy. Nano-particles are suspended in the epoxy while the epoxy is still in liquid form. Preferably, the polymer foam core is an exothermic foam, more preferably a polyurethane, wherein heat generated by the exothermic foam cures the epoxy, thereby causing the fibrous layer to be adhered to the foam core. The composite structural element preferably also includes a bulk laminate layer disposed between the polymer foam core and the fibrous layer.

In one embodiment, the nano-particles include carbon nano-particles, preferably having a diameter of approximately 10-200 nm. In another embodiment, the carbon nano-particles include nano-fibers approximately 60-200 nm in diameter and approximately 30-100 μm in length. In either case, the weight ratio of the carbon nano-particles to the epoxy is preferably at least 1:200 and no more than 1:2. More preferably, the weight ratio of the carbon nano-particles to the epoxy is at least 1:100 and no more than 1:10. In one embodiment, a weight ratio of the carbon nano-particles to the epoxy is substantially 1:10, and the structural element is a thermally conductive roofing panel. The nano-particles could also include at least one of carbon, a ceramic, tungsten, a carbide, titanium, zircon, aluminum, silver, or boron. Preferably, the nano-particles having a high thermal conductivity relative to the epoxy, so that the addition of the nano-particles reduces the curing time of the epoxy.

The fibrous layer of the composite preferably includes at least one of a woven polyester mat and/or a fiberglass mat. The fiberglass mat includes at least one of a chopped-strand fiberglass mat or a continuous filament fiberglass mat. The fibrous layer may include two fiberglass mats, each of the fiberglass mats being either a chopped-strand fiberglass mat or a continuous filament fiberglass mat.

In a preferred embodiment, the composite structural element of the invention is a structural insulated panel. In this embodiment, the at least one fibrous layer further comprising two fibrous layers on opposite sides of the foam core, both of the two fibrous layers adhered to the foam core by the nano-particle-impregnated epoxy. Optionally, the structural insulated panel may include an integrated dry wall finish applied to a first outer surface of one of the two fibrous layers, and/or it may include exterior masonry applied to a second outer surface of the other of the two fibrous layers.

In another embodiment, the nano-particles include at least one ceramic, preferably boron carbide, and the structural element provides ballistic shielding protection.

In another embodiment, the nano-particles are carbon and the structural element is a structural wrap formed around an existing load-bearing element. More specifically, the structural wrap may include a bridge substructure wrap and the existing load-bearing element is a bridge support column. In this embodiment, the wrap substantially encompasses all of the bridge support column; the foam core extends along at least approximately 80% of the length of the column.

The invention also includes a method of making a composite structural element. In the inventive method, nano-particles are first mixed into an epoxy, preferably a heat-curable epoxy. At least one fibrous layer is provided, and the fibrous layer is wetted with the nano-particle-impregnated epoxy. A heat source is then introduced to cure the epoxy. Preferably, the heat-introducing step entails providing a catalyzed foamable exothermic material in thermal communication with the wetted fibrous layer. In one embodiment, two wetted nano-particle-impregnated fibrous layers are provided in a mold, and the exothermic foam is introduced in direct contact with and in between the fibrous layers, thereby curing the epoxy and bonding the fibrous layers to the foam to form a foam core sandwiched between the two fibrous layers. Alternatively, a flexible receptacle having a wall, at least one opening, and an interior may be placed between the two fibrous layers, and the exothermic foam is introduced into the interior of the receptacle via the opening. The epoxy is thus cured with heat released from the exothermic foam that passes though the wall of the receptacle.

In adding the nano-particles to the epoxy, the mixing step preferably includes the steps of: adding the nano-particles to the hardener of the epoxy, and then mixing the nano-particle-impregnated hardener with a resin. The nano-particle mixing step is preferably performed so that a weight ratio of the nano-particles to the epoxy is at least 1:200 and no more than 1:2, and more preferably at least 1:100 and no more than 1:10 when using carbon nano-particles. However, the nano-particles added during the nano-particle mixing step may include at least one of carbon, a ceramic, tungsten, a carbide, titanium, zircon, aluminum, silver, or boron.

In another embodiment of the inventive method, the wetted nano-particle-impregnated fibrous layer is placed before curing (preferably in situ) around an existing load-bearing element. A mold and a second wetted nano-particle-impregnated fibrous layer are placed around the first fibrous layer and spaced apart from the first fibrous layer. The exothermic foam is then introduced into the mold between the two wetted fibrous layers. In this way, an existing load-bearing element, such as a bridge support column, may be rapidly reinforced or repaired without taking the column out of service. In these type of situations, the foam is provided along at least approximately 80% of the length of the existing load-bearing element.

The present invention offers a method whereby relatively inexpensive fibers can be used by including nano-particles into the epoxy-composite matrix. The resulting composite structure nears the strength and performance properties of traditional composite structure, while reducing the cost of the finished product.

DETAILED DESCRIPTION OF THE INVENTION AND DRAWINGS

Description of the invention will now be given with reference to FIGS. 1-5. It should be understood that these figures are exemplary in nature and in no way serve to limit the scope of the invention which is defined by the claims appearing hereinbelow.

Figure 1:
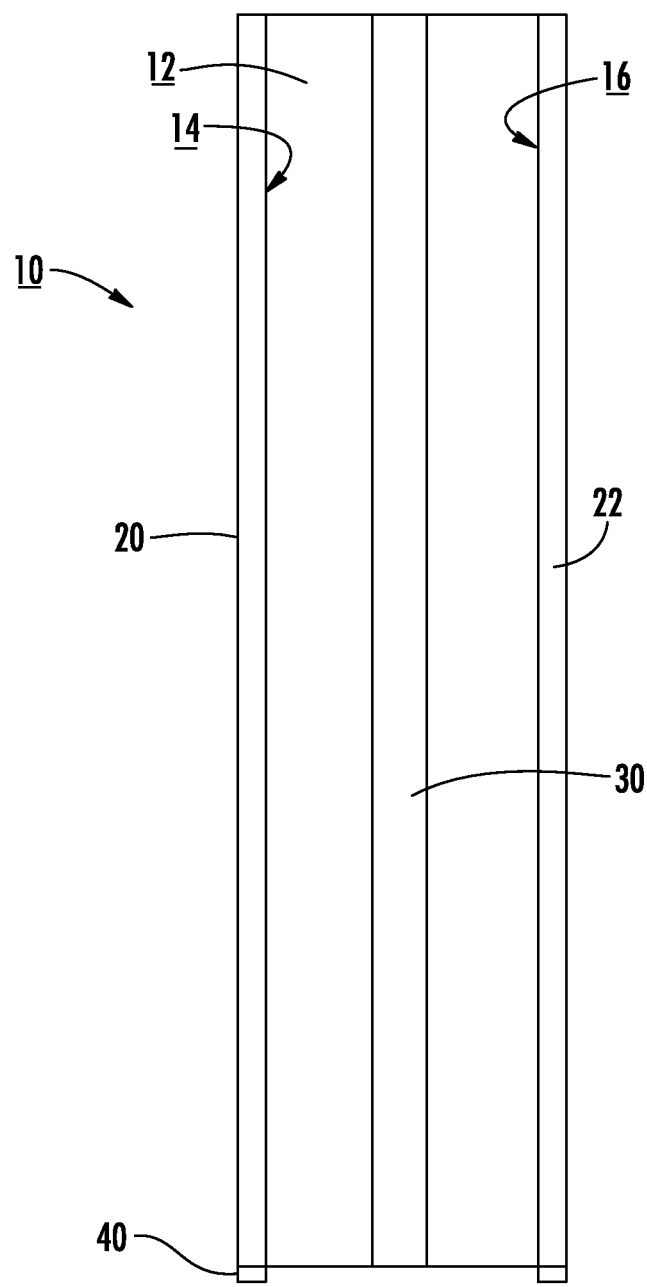
FIG. 1 is a side sectional drawing of a composite structural insulated panel made in accordance with the invention.

A simplified schematic of a structural panel 10 in accordance with the invention is shown in sectional view in FIG. 1. Panel 10 includes a foam core 12 sandwiched between two fibrous layers 14 and 16. The fibrous layers are impregnated with an epoxy in which nano-particles are suspended; the epoxy causes fibrous layers 14 and 16 to adhere to foam core 12, while the suspended nano-particles add strength or other properties to the composite. Because the epoxy and the foam chemically react and form a well-bonded region 15 (see FIG. 3), there is little or no change of delamination of the fibrous layers from the foam core. For example, carbon nano-particles suspended in the impregnated epoxy provide significant increases in strength, so much so that cheaper fibrous layers such as fiberglass or polyester can be used and yet still achieve similar strength properties as using much more expensive woven carbon fiber mats.

External layer 20 is adapted to face the exterior of a building and may include conventional exterior masonry such as stucco, brickface, or the like. External layer 20 may be applied directly to the outer surface of fibrous layer 14 after the epoxy has completely cured (see below). Similarly, internal layer 22 is adapted to face the interior of a building and may include conventional interior surfacing material such as drywall, wallpaper, wood paneling, etc.

Figure 2:
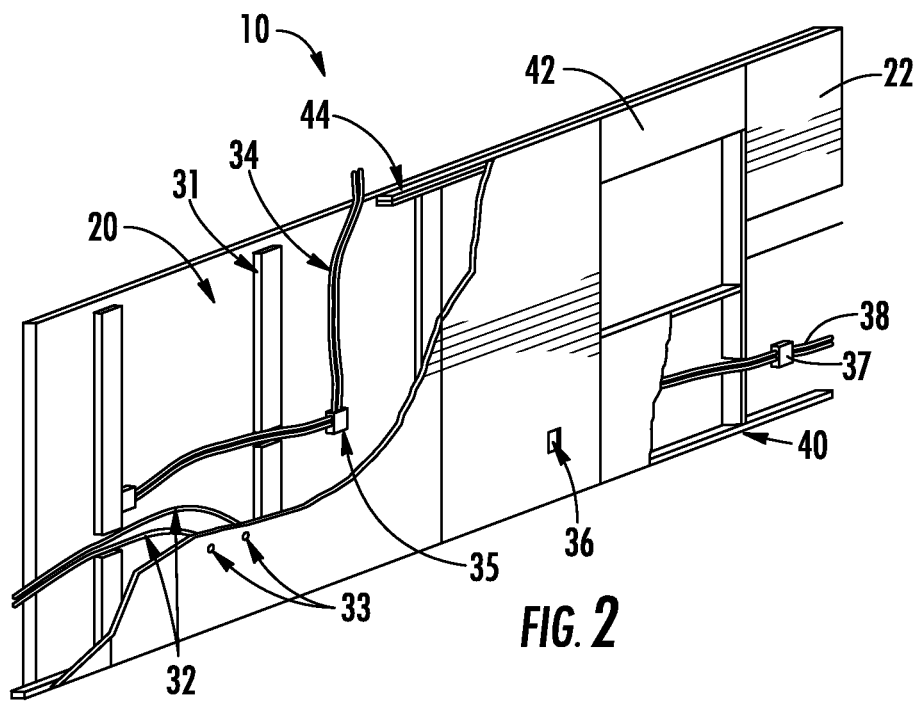
FIG. 2 is a broken perspective drawing of a composite structural insulated panel in accordance with the invention having a variety of features.
Figure 3:
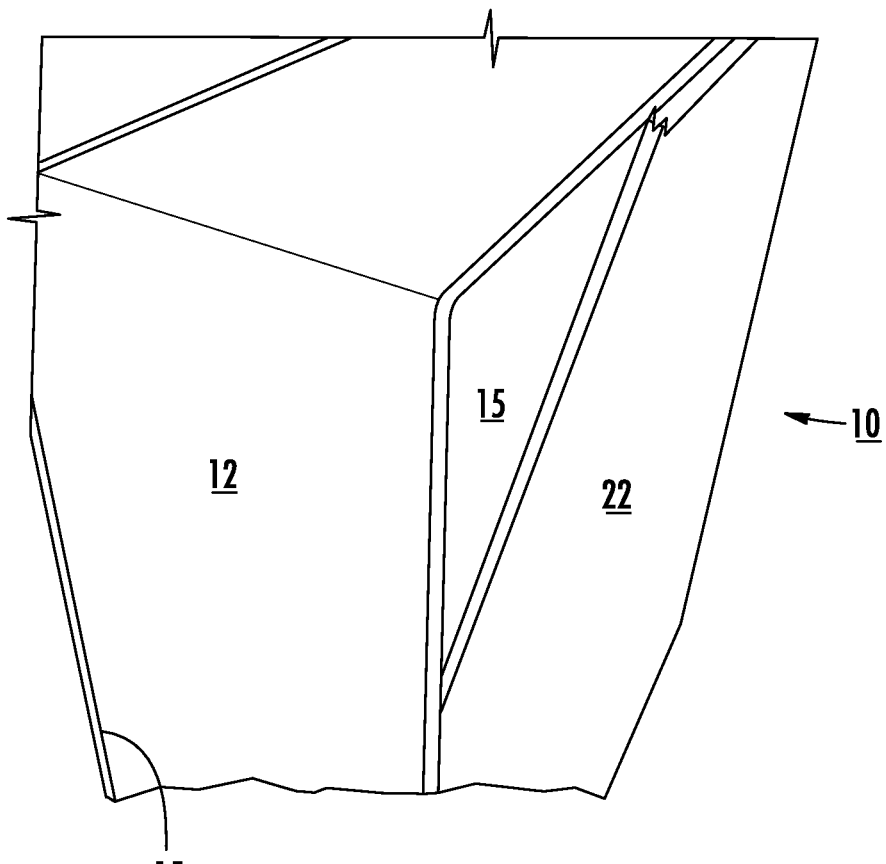
FIG. 3 is another broken perspective view of a composite structural insulated panel in accordance with the invention with a portion of one outer surface removed for clarity.

Core insert element 30 is disposed inside foam core 12 and represents any of a number of different integratable conventional building structures that are typically used in construction. FIG. 2 depicts structural panel 10 with parts of its internal layer 22 in broken perspective and with its foam core removed for clarity. In FIG. 2, a number of different such exemplary core insert elements 30 are shown, for example: stiffening spines 31; water piping 32 and water supply nipples 33; electrical conduit 34 and light switch 35; electrical outlet 36; junction box 37 and conduit connector 38; and the like. Additionally, perimetric structural elements such as sill plate 40 (also shown in FIG. 1), header fill 42, top plate 44, and similar elements may be included in or on panel 10. It is contemplated that the inventive panel may include any and all of these type of elements, and other similar elements not shown, but need not include even one of them to fall within the scope of the invention.

The manufacture of a structural panel in accordance with the invention is as follows. For the preferred structural panel, carbon nano-particles are used. The carbon nano-particles in the proper concentration (to be discussed below) are suspended in a liquid epoxy. Specifically, carbon nano-particles are preferably added to the hardener portion of the epoxy, as it is thinner, and the nano-particles are more readily evenly suspended and dispersed in the hardener. Once the nano-particles are evenly distributed through the hardener, the hardener-with-nano-particles suspension is mixed with the resin. This is advantageous for the further mixing of the nano-particles throughout the epoxy mixture, as hardener molecules seek out resin molecules and help distribute the carbon nano-particles throughout the epoxy. As a result, there is little or no clumping of the carbon nano-particles in the mixture, and an expensive mixing device is not needed.

The preferred weight ratio of carbon nano-particles to epoxy ranges from 1:200 to as much as 1:2, though more preferably the range is 1:100 to 1:10. Depending on the properties desired of the resultant panel, the ratio can be adjusted. Using less than 0.5 g of carbon nano-particles for every 100 g of epoxy yields very little strength benefit. Using more than 50 g of carbon nano-particles for every 100 g of epoxy yields a pasty, brittle mixture unsuitable for use.

In any event, the fibrous layer is wet with the nano-particle and epoxy solution, forming the composite. The composite is then cured using the method described in U.S. Pat. No. 6,117,376 or by use of an autoclave. Specifically, as mentioned above, a mold is created and fibrous layers of one or more forms line the inside surfaces of the mold halves. In the inventor's previous patent, the fibrous layers were preferably carbon fiber reinforced at the least, if not entirely made from carbon fiber. As a result, the product, although of excellent strength and durability, is too costly to be practical on a mass-produced scale.

Instead, the fibrous layers can be made from much less expensive materials, such as polyester, nylon, or fiberglass. In a preferred embodiment, if polyester is used, it should be in the form of a woven polyester mat. If fiberglass is used, it can be either a chopped-strand fiberglass mat or a continuous filament fiberglass mat (or both). The fibrous layer may include two fiberglass mats, each of the fiberglass mats being either a chopped-strand fiberglass mat or a continuous filament fiberglass mat. Preferably, one layer of fiberglass and one layer of either polyester or nylon as a backing layer are used. Whatever is used, the fibrous layers are wetted with the nano-particle-impregnated heat-curable epoxy, and the mold halves are closed together to form an interior cavity having an opening. Exothermic foam is introduced into the mold cavity in an amount so as to overfill the mold. The foaming material expands and heats up, causing the heat-curable epoxy to cure. Since an abundance of foam is provided, excess foam spills out of the opening in the cavity, but because the foam expands so rapidly, the pressure inside the mold causes the fibrous layers to be pressed flat against the inner surfaces of the mold. In addition, the epoxy cures (from the heat generated by the exothermic reaction of the foam) and causes the fibrous layers to stick securely to the internal foam. The resulting composite is exceptionally strong and can be created in substantially any shape. Also, as mentioned above, various other construction elements may be molded within the foam.

An added benefit of the carbon nano-particles is that their presence causes heat-curable epoxy to cure faster, up to 50% faster. For example, 5-minute epoxy in which carbon nano-particles have been suspended has been observed to cure in 2-3 minutes, depending on the ratio of nano-particles to epoxy used.

Once cured, the composite structure has various applications and is ideally suited for structural components that require low weight, high shear, high load, and high tensile strengths. The preferred embodiment focuses on building applications and centers around a product called a composite structural insulated panel (CSIP). The CSIP can be used for wall, floor, and roof panel systems in residential and non-residential buildings where low-cost, highly insulated structural components are advantageous. A CSIP includes a polyurethane core and has outer skins comprised of low-cost chop-strand fiberglass mat and polyester woven mat. The skins are bonded to the polyurethane by a nano-particle and epoxy solution as described above, forming a composite suitable for building. The CSIP can be made with any style edge to accommodate different designs for different applications. Because the CSIP can be molded into essentially any shape, an ordinary wood 2×4 may be used as a spline, or the panels can be simply glued together if formed with a tongue and groove system.

The CSIP is extremely strong yet lightweight and compares favorably to both wood SIPs and concrete blocks. The CSIP exceeds the International Code Council's Acceptance Criteria for Sandwich Panels (ICC-ES AC04) and Acceptance Criteria for Shear Wall Assemblies Consisting of Wood Structural Panel Sheeting Attached to Cold-Formed Steel Framing with Pneumatic or Gas-Power-Driven Fasteners (ICC-ES AC230). The framing costs for a CSIP are about the same as those of a wood SIP and about 40% of that of concrete block, yet the shipping costs (owing to its extremely light weight construction and the ability for it to be made on site, if need be) are lower than those of either wood frame, wood SIPs, or concrete. The CSIP is extremely high in corrosion and insect resistance (like concrete, unlike wood frame or wood SIps), yet it is very easy to work with and easy to assemble (like wood SIPs, unlike concrete). The CSIP also has superior sound insulation to either wood SIPs or concrete block. For extra sound insulation, carbon nano-tubes can be added to both the epoxy during the mixing process and the foam prior to injection into the mold. In addition, as alluded to above, the exterior side of a CSIP is ready to accept stucco or other similar masonry, while the interior side may be provided with an integral drywall finish; none of wood frame, wood SIPs, nor concrete block exhibits such design flexibility.

Since the carbon nano-particles retain heat well, this property also makes the CSIP manufactured by the inventive method an excellent insulator; they typically have a wall R-Value of R-30 and a roof R-Value of R-60. This compares very favorably to a typical wood SIP (wall R-Value of R-15, roof R-Value of R 30) or concrete block (wall R-Value of R-19, roof R-Value of R-30). As such, the CSIP makes an excellent roofing tile as well as a structural wall. One preferred formulation of roofing tile utilizes 10 g of carbon nano-particles for every 100 g of epoxy; this formulation provides the thus-made roofing tile with excellent thermal properties. Roof panel CSIPs reduce the heat island effect of a building because they have a high thermal emittance and release stored heat.

Figure 4:
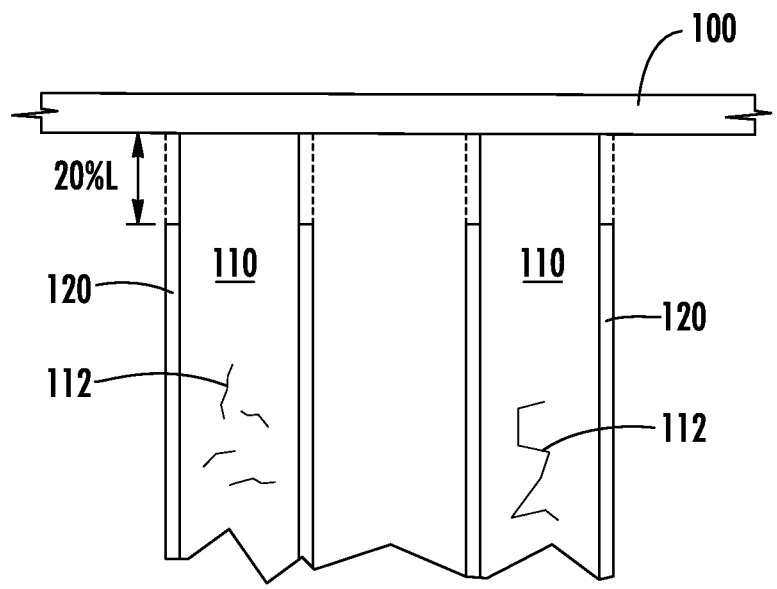
FIG. 4 is a side sectional schematic of one application of the invention as a bridge substructure retrofit.
Figure 5:
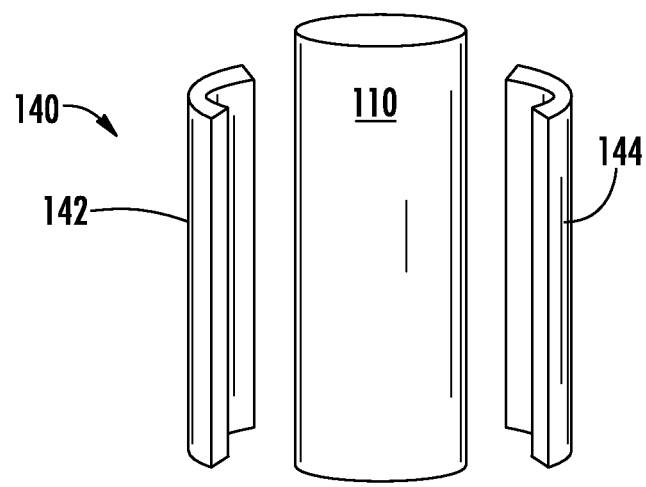
FIG. 5 is a side perspective schematic of the formation of the bridge substructure retrofit of FIG. 4.

Since the CSIP is a structural element, it need not be limited to new construction applications; it can also be used to retrofit existing infrastructure far more quickly, inexpensively, and practically than rebuilding or using a traditional steel retrofit. FIGS. 4 and 5 depict one such retrofit, of bridge substructure support columns. In FIG. 4, an exemplary roadway 100 is supported underneath by columns 110. As happens eventually with all support columns subject to wear and tear and exposure to the elements, cracks 112 have begun to develop. Rather than replace the entire bridge or even an entire column with another column, or even the conventional retrofit fix of cladding the column in a steel and concrete jacket, a wrap 120 of the inventive structural material may be employed instead.

FIG. 5 shows a typical cylindrical bridge column 110. For this type of application, it is preferred to apply a coating of carbon nano-particle impregnated epoxy directly to column 110, and then affix at least one fibrous layer to the epoxy-coated column. It is preferred that enough epoxy be applied to the column that it soaks through and fully wets the fibrous layer. A hollow cylindrical mold 140 made of at least two mold sections 142 and 144 is provided. At least one fibrous layer is placed in each of mold sections 142 and 144 and wetted with nano-particle-impregnated epoxy. Mold 140 is closed around column 110 and is dimensioned so that there is clearance between the fibrous layer placed on mold 140 and the fibrous layer placed around column 110. As with the flat panel, exothermic foaming material is introduced into the gap between the mold and the column. The foam expands and releases heat, which cures the epoxy and causes the entire retrofit structure to harden. The result is a retrofit that may be performed and installed in situ without requiring the closing of the roadway above as with a conventional steel jacket retrofit (so long as the damage to the substructure had not already progressed farther than would allow traffic above). Additionally, the inventive composite nano-particle retrofit is much lighter than the steel jacket retrofit and takes about half the time. Finally, the inventive retrofit does not require the replacement of the column footing, which is required with a steel jacket retrofit.

The substructure wrap may entirely encase a support column, however it need not do so. The majority of damage to and failures of bridge support columns occur in the bottom third of the column. As such, as shown in FIG. 4, the foam core of the wrap need only extend the lower 80% of the length of the column, leaving the upper 20% covered only in fibrous layers with nano-particle-impregnated epoxy.

The preferred size range for carbon nano-particles is from 10 nm to as much as 200 nm in diameter. Carbon nano-particles suitable for use may be as-grown, pyrolytically stripped (of surface polyaromatic hydrocarbons), or heat treated. As-grown nano-particles are the least expensive and help keep the overall cost of a CSIP down. Alternatively, carbon nano-fibers of 70-200 nm wide and 50-100 microns long may be used. As a substitute for carbon, silicon carbide and titanium carbide nano-particles may be employed. All of the above-mentioned nano-particles may be obtained from American Elements of Los Angeles, Calif.; the carbon nano-particles and nano-fibers are suitably produced by Applied Sciences, Inc. of Cedarville, Ohio under the Pyrograph name; appropriate carbon nano-particles are also available from Asbury Carbons of Asbury, N.J.

As mentioned above, the invention allows the replacement of expensive woven carbon fiber in construction with much less expensive fiberglass or polyester layers (or both). In one embodiment of the inventive structural panel, a bulk laminate polyester layer is used in conjunction with either a chopped strand or continuous filament fiberglass layer. One preferred bulk laminate polyester is made by Fibre Glast of Brookville, Ohio, model no. 2258-A1 (either in 2 mm or 4 mm). One preferred continuous filament fiberglass layer is produced my Owens-Corning as continuous filament mat no. 44986-NAM (preferably the 8 oz. mat). As an alternative to polyester, nylon may be used.

Thousands of epoxy resins are available for use in forming the CSIP, though some are more advantageously used in certain applications. For example, marine resins are generally excellent for use in outdoor applications in high humidity environments or for the retrofit of bridge support columns which are in or near bodies of water. Other types of epoxy resins that may be employed are room-temperature curable resins (which may nevertheless be accelerated in their curing by the addition of heat from the exothermic foam); fire resistant/retardant resins, for dwellings and commercial space; and high impact resistant resins, for ballistic and armor applications. One epoxy system that the inventor has used with success is the EL-319 series made by CASS Polymers of Madison Heights, Mich. Using the EL-319 resin with either the EL-319 hardener or the EL-319-1 longer work life hardener yields a structural panel that is extremely flame retardant (approximately four hours) and otherwise versatile.

The preferred type of exothermic foam is polyurethane, specifically closed cell foam. Open cell foam is typically not strong enough to provide adequate support for a structural panel. Foam density is also important to the strength and insulation value of the structural panel, however the required density varies from application to application. Closed cell 4-lb density foam has the best R-Value per strength ratio and is best suited for most CSIP applications. Closed cell 6-lb density foam has higher strength than 4-lb foam but a lower R-Value; 6-lb foam may be more useful in panels having a number of core insert elements 30 (see, e.g., FIGS. 1-2); the more core insert elements a panel has, the weaker the panel becomes. Higher density foam (e.g., 8-lb or 16-lb) has greater strength but lower insulative properties. Foam with lower density than 4-lb foam (e.g., 2-lb foam) may be extremely lightweight and an excellent insulator but will not have enough structural strength for use with most CSIP applications. In any event, additives may be added to the foam for purposes of strength, flame or insect resistance, sound insulation, or other reasons. For example, the addition of carbon nano-tubes to the foam of a CSIP greatly increases its sound insulation properties.

One preferred embodiment of the CSIP panel uses one layer of E-type chopped strand fiberglass mat with one layer of bulk laminate polyester as a backing pad together as the fibrous layer. The fibrous layer is wetted with fire resistant epoxy (e.g., the EL-319 series of CASS Polymers) which has been impregnated with carbon nano-particles in a ratio of 2 g of carbon nano-particles to 100 g of epoxy. Either 4-lb or a soy-based 6-lb polyurethane foam is used as the core.

In another embodiment, ceramic nano-particles may be substituted for and/or added to the carbon nano-particles to provide or augment the ballistic shielding protection a panel may offer. Traditional ballistic plates are formed from solid ceramic such as boron carbide ($B_4C$), alumina ($Al_2SO_3$), or silicon carbide (SiC). However, solid ceramic plates of $B_4C$ and similar materials are extremely expensive. Instead, in accordance with the invention, fibrous layers such as polyester or fiberglass are wetted with ceramic nano-particle-impregnated epoxy and heat cured. The foam core is not necessary for ballistic plates or panels. Panels made in this manner are nearly as strong as solid ceramic plates of the same material but are far less expensive.

Smaller panels made by the above-described method may also be used as ballistic insert plates or packs for body armor, vehicular armor, and other ballistic applications. Larger panels may be provided as the core insert elements 30 (see FIG. 1) of a regular CSIP and provide ballistic protection features to the structural panel. Ceramic nano-particles best suited for this application include $B_4C$ and alumina.

The invention is not limited to the above description. For example, while carbon nano-particles have been described for use in structural applications and ceramic nano-particles have been described for use in ballistic applications, a mix of both carbon and ceramic nano-particles may also be employed. Further, additional features may be added to the CSIP via the addition of other types of nano-particles. For example, EMI/RFI shielding can be provided for military and industrial applications in which eavesdropping protection is required. Aluminum, copper, nickel, and silver nano-particles can be used for this purpose along with either or both carbon and/or ceramic nano-particles.

Having described certain embodiments of the invention, it should be understood that the invention is not limited to the above description or the attached exemplary drawings. Rather, the scope of the invention is defined by the claims appearing hereinbelow and any equivalents thereof as would be appreciated by one of ordinary skill in the art.

What is claimed is:

1. A construction/infrastructure composite structural element comprising:

a polymer foam core;

at least one fibrous layer adhered by liquid epoxy to said polymer foam core;

and comprising nano-particles; and at least one of an external or an internal construction/infrastructure layer disposed atop said at least one fibrous layer, wherein said nano-particles comprise nano-fibers of approximately 60-200 nm in diameter, approximately 30-100 µm in length, and with a specific surface area (SSA) in the 30-50 m$^2$/g range, that are suspended evenly throughout said liquid epoxy, so that a weight ratio of said nano-particles to said epoxy is at least 1:200 and no more than 1:2.

2. A composite structural element according to claim 1, said polymer foam core comprising an exothermic foam, wherein heat generated by said exothermic foam cures said epoxy, thereby causing said fibrous layer to be adhered to said foam core.

3. A composite structural element according to claim 2, said nano-particles having a high thermal conductivity relative to said epoxy, wherein the addition of said nanoparticles reduces the curing time of said epoxy.

4. A composite structural element according to claim 2, said nano-particles comprising carbon and said structural element comprising a structural wrap formed around an existing load-bearing element.

5. A composite structural element according to claim 4, wherein said structural wrap comprises a bridge substructure wrap and the existing load-bearing element is a bridge support column.

6. A composite structural element according to claim 5, wherein said wrap substantially encompasses all of the bridge support column and said foam core extends along at least approximately 80% of the length of the column.

7. A composite structural element according to claim 1, further comprising a bulk laminate layer disposed between said polymer foam core and said fibrous layer.

8. A composite structural element according to claim 1, said polymer foam core comprising a polyurethane.

9. A composite structural element according to claim 1, said nano-particles comprising carbon nano-particles.

10. A composite structural element according to claim 9, wherein a weight ratio of said carbon nano-particles to said epoxy is substantially 1:10, and said structural element comprises a thermally conductive roofing panel.

11. A composite structural element according to claim 9, wherein said structural element comprises a structural insulated panel.

12. A composite structural element according to claim 11, said at least one fibrous layer further comprising two fibrous layers on opposite sides of said foam core, both of said two fibrous layers adhered to said foam core by said nano-particle-impregnated epoxy.

13. A composite structural element according to claim 12, further comprising an integrated dry wall finish as an internal layer of said at least one external or internal construction/infrastructure layer applied to a first outer surface of one of said two fibrous layers.

14. A composite structural element according to claim 13, further comprising exterior masonry as an external layer of said at least one external or internal construction/infrastructure layer applied to a second outer surface of the other of said two fibrous layers.

15. A composite structural element according to claim 1, said nano-particles comprising at least one of carbon, a ceramic, tungsten, a carbide, titanium, zircon, aluminum, silver, or boron.

16. A composite structural element according to claim 1, said fibrous layer comprising:

a woven polyester mat; and a fiberglass mat.

17. A composite structural element according to claim 16, said fiberglass mat comprising at least one of a chopped-strand fiberglass mat or a continuous filament fiberglass mat.

18. A composite structural element according to claim 1, said fibrous layer comprising a polyester mat.

19. A composite structural element according to claim 1, said fibrous layer comprising at least one of a chopped-strand fiberglass mat or a continuous filament fiberglass mat.

20. A composite structural element according to claim 1, said fibrous layer comprising two fiberglass mats, each of said fiberglass mats being either a chopped-strand fiberglass mat or a continuous filament fiberglass mat.

21. A composite structural element according to claim 1, said nano-particles comprising at least one ceramic and said structural element comprising a ballistic shielding element.

22. A composite structural element according to claim 21, said ceramic nanoparticles comprising at least one of boron carbide and alumina.

* * * * *